US012356118B2

(12) United States Patent
Thiel

(10) Patent No.: US 12,356,118 B2
(45) Date of Patent: *Jul. 8, 2025

(54) VIDEO COMMUNICATIONS PLATFORM VIRTUAL ENVIRONMENT STREAMING

(71) Applicant: Zoom Communications, Inc., San Jose, CA (US)

(72) Inventor: Jordan Thiel, Leander, TX (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/614,148

(22) Filed: Mar. 22, 2024

(65) Prior Publication Data

US 2024/0305746 A1  Sep. 12, 2024

Related U.S. Application Data

(63) Continuation of application No. 17/515,498, filed on Oct. 31, 2021, now Pat. No. 11,968,476.

(51) Int. Cl.
*H04N 7/15* (2006.01)
*G03H 1/02* (2006.01)
*G06T 15/20* (2011.01)
*G06T 19/20* (2011.01)
*H04L 65/401* (2022.01)

(52) U.S. Cl.
CPC .............. *H04N 7/157* (2013.01); *G03H 1/02* (2013.01); *G06T 15/205* (2013.01); *G06T 19/20* (2013.01); *H04L 65/4015* (2013.01)

(58) Field of Classification Search
CPC ......... G06T 15/205; G06T 19/20; G04H 1/02; H04L 65/4015; H04N 7/157
See application file for complete search history.

(56) References Cited

U.S. PATENT DOCUMENTS

| | | |
|---|---|---|
| 2011/0115877 A1 | 5/2011 | Kang |
| 2014/0362165 A1* | 12/2014 | Ackerman ............ G06Q 10/10 348/14.07 |
| 2015/0049001 A1 | 2/2015 | Rahman et al. |
| 2016/0133201 A1 | 5/2016 | Border et al. |
| 2020/0294317 A1 | 9/2020 | Segal |
| 2021/0281638 A1 | 9/2021 | Vrcelj et al. |
| 2021/0311608 A1 | 10/2021 | Sommer et al. |
| 2022/0141548 A1 | 5/2022 | Niamut et al. |
| 2022/0374585 A1* | 11/2022 | Wang .................. G11B 27/031 |

* cited by examiner

*Primary Examiner* — Daniel F Hajnik
*Assistant Examiner* — Jed-Justin Imperial
(74) *Attorney, Agent, or Firm* — Young Basile Hanlon & MacFarlane, P.C.

(57) ABSTRACT

Methods, systems, and apparatus, including computer programs encoded on computer storage media relate to a method for casting from a virtual environment to a video communications platform. The system may provide a video conference session in a video conference application. A connection may be established between the video conference application and a VR or AR device. The video conference application may receive 2D video content from the VR or AR device. The 2D video content may comprise a view of a virtual environment. The video conference application may stream the 2D video content in the video conference session.

20 Claims, 11 Drawing Sheets

VIDEO COMMUNICATIONS PLATFORM VIRTUAL ENVIRONMENT STREAMING

CROSS-REFERENCE TO RELATED APPLICATION(S)

This application is a continuation of U.S. patent application Ser. No. 17/515,498, filed Oct. 31, 2021, the entire disclosure of which is hereby incorporated by reference.

FIELD

The present invention relates generally to video communications, and more particularly, to systems and methods for casting from a virtual environment to a video communications platform.

SUMMARY

The appended claims may serve as a summary of this application.

DETAILED DESCRIPTION OF THE DRAWINGS

Figure 1A:
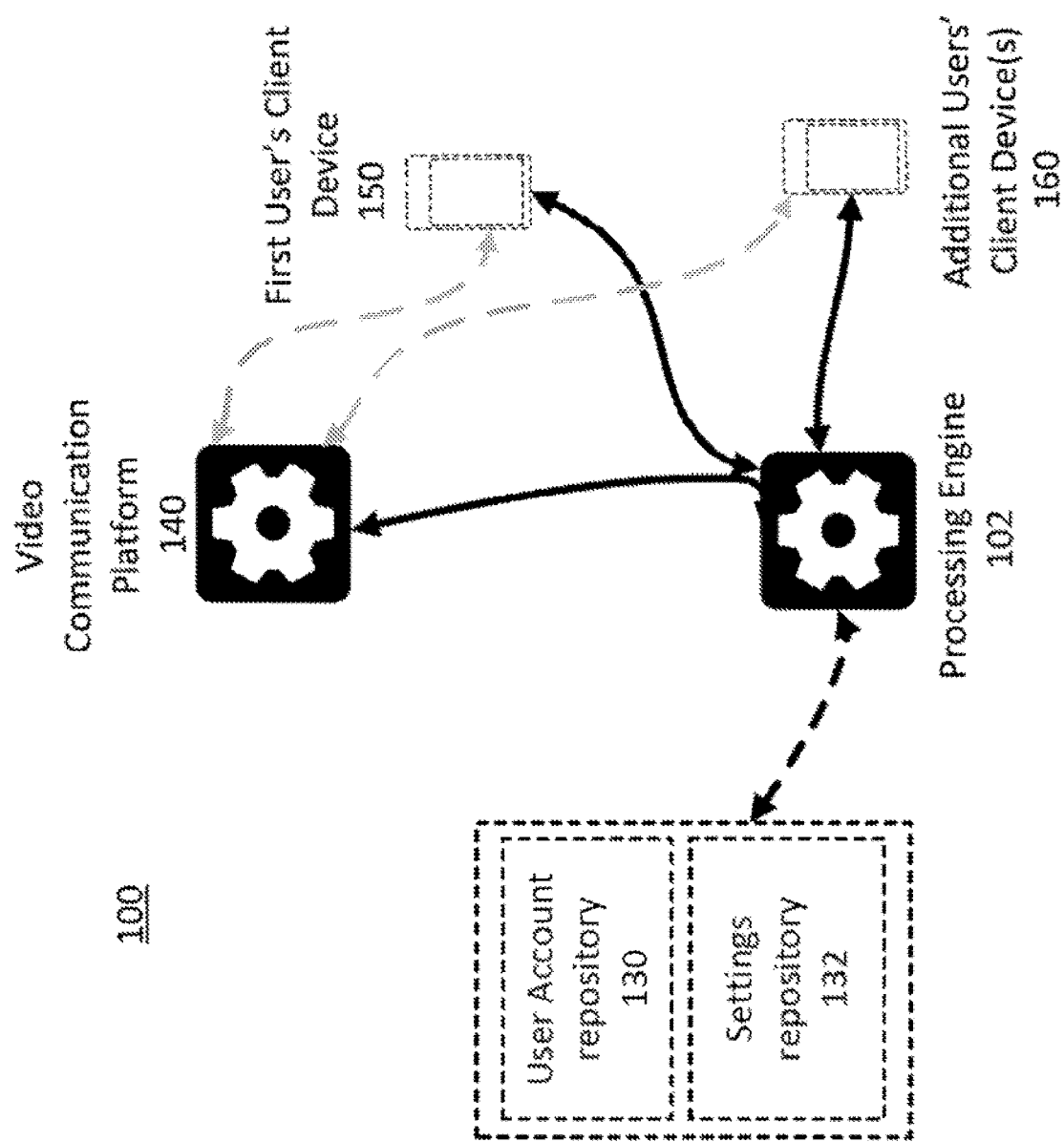
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the method 900, or other methods herein and, as a result, provide for casting from a virtual environment to a video communications platform. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform the method 900, or other methods herein and, as a result, provide for casting from a virtual environment to a video communications platform. In some embodiments, this may be accomplished via communication with the first user's client device 150, additional users' client device(s) 160, processing engine 102, video communication platform 140, and/or other device(s) over a network between the device(s) and an application server or some other network server.

The first user's client device 150 and additional users' client device(s) 160 may be devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, webinar, or any other suitable video presentation) on a video communication platform. The additional users' client device(s) 160 may be configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, video phone, conferencing system, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include virtual environment settings, virtual reality (VR) settings, augmented reality (AR) settings, audio settings, video settings, video processing settings, and so on. Settings may include enabling and disabling one or more features, selecting quality settings, selecting one or more options, and so on. Settings may be global or applied to a particular user account.

Video communication platform 140 comprises a platform configured to facilitate video presentations and/or communication between two or more parties, such as within a video conference or virtual classroom. In some embodiments, video communication platform 140 enables video conference sessions between one or more users.

Figure 1B:
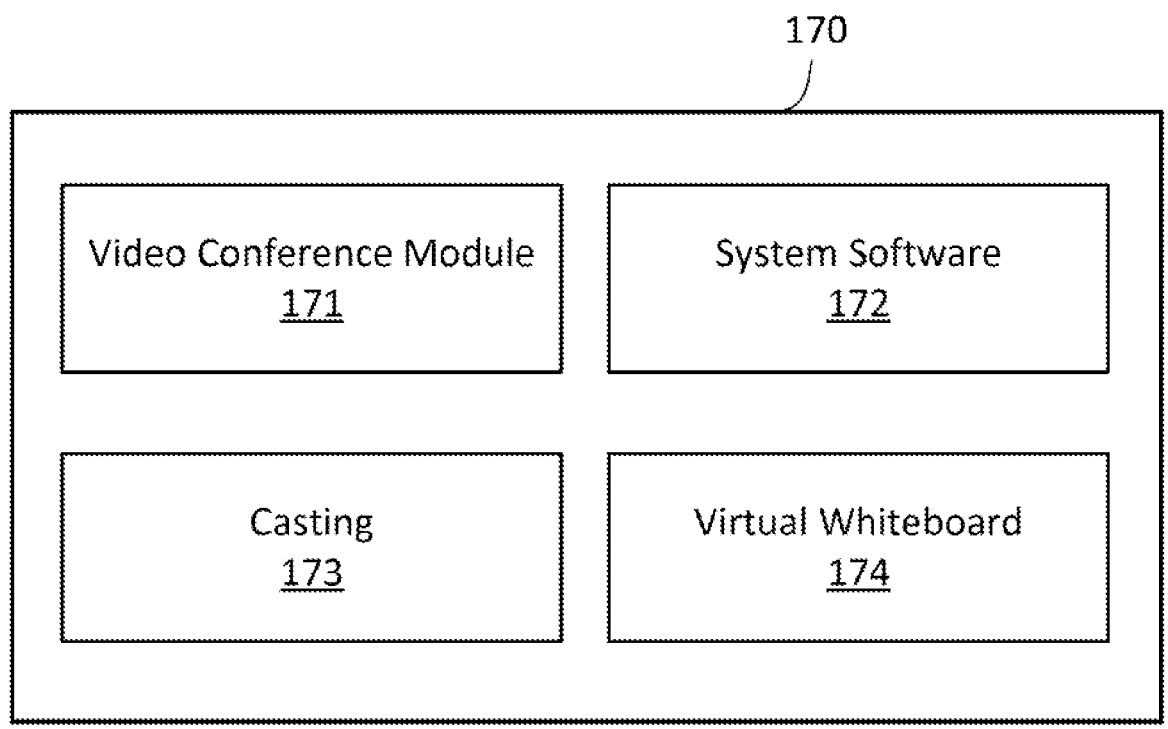
FIG. 1B is a diagram illustrating an exemplary computer system with software and/or hardware modules that may execute some of the functionality described herein.

FIG. 1B is a diagram illustrating an exemplary computer system 170 with software and/or hardware modules that may execute some of the functionality described herein. Computer system 170 may comprise, for example, a server or client device or a combination of server and client devices for extracting a user representation from a video stream to a virtual environment.

Video conference module 171 provides system functionality for providing video conferences between one or more video conference participants. Video conference module 171 may comprise part or all of the video communication platform 140 and/or processing engine 102. Video conference module 171 may host a video conference session that enables one or more participants to communicate over video. In some embodiments, video conference module 171 may require users to authenticate themselves to join a video conference, such as by providing credentials like a username and/or password. In some embodiments, video conference module 171 may allow guest users to join a video conference without authenticating themselves and may notify participants in the meeting that one or more unauthenticated participants are present. A video conference session may include one or more video streams that each display one or more of the participants, or other scenes such as a screenshare or a virtual environment as described herein. In an embodiment, synchronized audio may be provided with the video streams.

System software 172 provides system functionality for managing a computer system and providing a platform for application software. In an embodiment, system software 172 may comprise an operating system, networking software, firmware, drivers, software development kits (SDKs), software utilities, and/or other system software. In an embodiment, system software 172 may provide system management functionality for a VR or AR device. In an embodiment, VR or AR applications may run on system software 172 by using one or more computer procedures of the system software. In an embodiment, system software 172 may provide casting functionality for casting video of a VR or AR application to another device. In an embodiment, system software 172 may capture a view of the VR or AR application and convert the view to video. In an embodiment, system software 172 may implement casting functionality in coordination with casting module 173. In an embodiment, the system software 172 may provide a universal casting ability to cast from an arbitrary VR or AR application without casting functionality being provided in the VR or AR application. In an embodiment, the system software 172 may capture a view of the VR or AR application at the system level without view capture functionality being provided at the application level in the VR or AR application.

Casting module 173 provides system functionality for casting video of a VR or AR application to a video conference application. In an embodiment, casting module 173 may comprise a system integration in a VR or AR device. In an embodiment, VR or AR device may include one or more system integrations for casting to different devices on a local network. In an embodiment, casting module 173 may receive a request from system software 172 to cast to the video conference application. In an embodiment, casting module 173 may transmit 2D video content capturing a view of the VR or AR application to the video conference application. In an embodiment, casting module 173 provides a universal casting ability to cast video of a view of an arbitrary VR or AR application by using casting functionality of the system software 172 and without casting functionality being provided in the VR or AR application.

Virtual whiteboard 174 provides system functionality for a virtual collaboration space. In some embodiments, virtual whiteboard 174 may allow functionality such as creating and editing objects, drawing, erasing, creating and deleting text or annotations, and so on. In an embodiment, one or more participants in a video conference session may share one or more virtual whiteboards 174 where they may collaborate and share information. In some embodiments, the contents of one or more virtual whiteboards 174 may be stored for retrieval at a later date. In some embodiments, contents of one or more virtual whiteboards 174 may be combined with other virtual whiteboards 174, such as by importing the content of virtual whiteboard into another virtual whiteboard.

Figure 2:
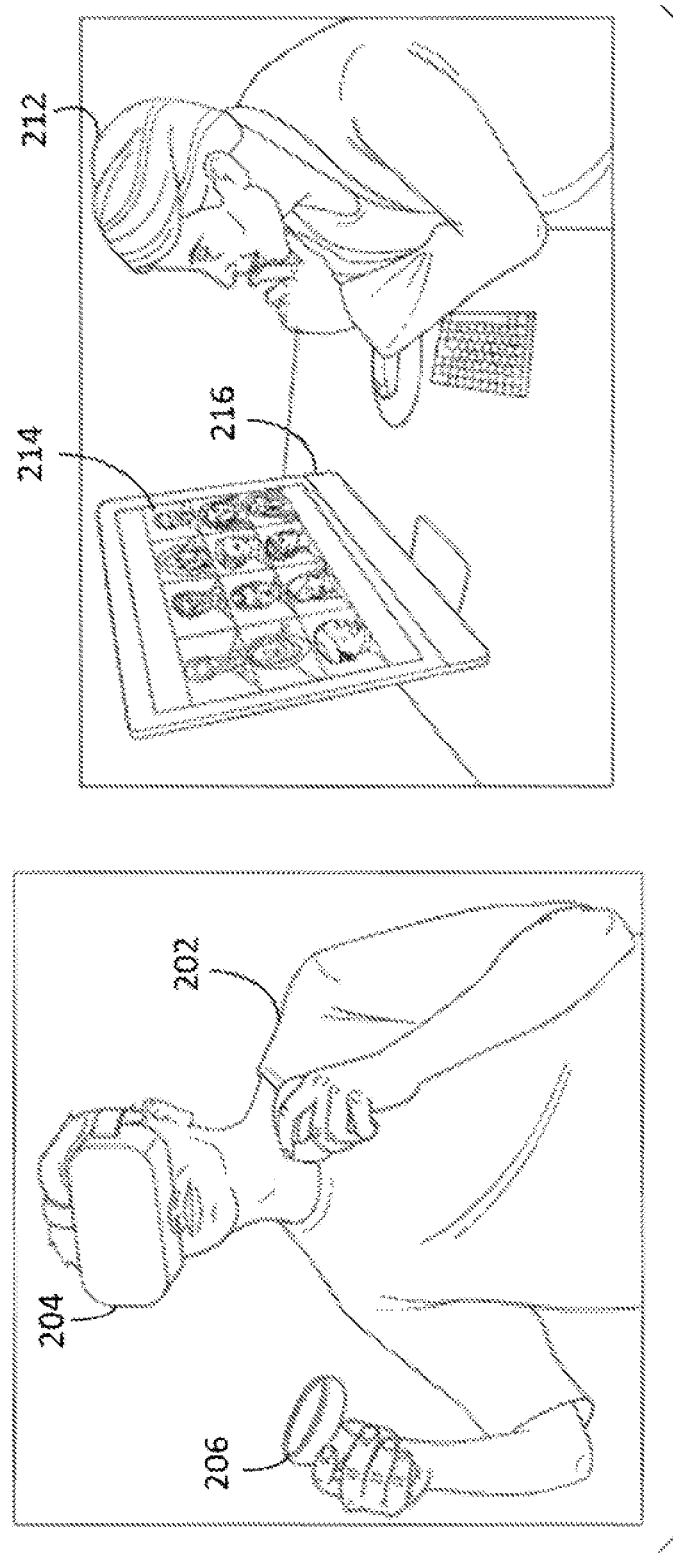
FIG. 2 illustrates one or more client devices that may be used to participate in a video conference and/or virtual environment.

FIG. 2 illustrates one or more client devices that may be used to participate in a video conference and/or virtual environment.

In an embodiment, a VR headset 204 may be worn by a VR user 202 to interact with a VR environment. The VR headset 204 may display 3D graphics to the VR user 202 to represent a VR environment, which may be generated by a VR application. Moreover, the VR headset 204 may track the movement of the VR user's head and/or other body parts to update its display to simulate an experience of being in the VR environment. In an embodiment, a VR headset 204 may optionally include controllers 206 to control the VR application. In some embodiments, the VR headset 204 may enable the VR user 202 to participate in a video conference within a VR environment.

Similarly, in an embodiment, an AR headset may be worn by an AR user to interact with an AR environment. The AR headset may display AR graphics, such as holograms, to the AR user to represent an AR environment, which may be generated by an AR application. The AR application may enable viewing a mixed reality environment that includes some AR objects and some real objects. Moreover, the AR headset may track the movement of the AR user's head or other body parts to update its display to simulate the AR environment. In an embodiment, an AR headset may optionally include controllers to control the AR application. In some embodiments, the AR headset may enable the AR user to participate in a video conference within an AR environment.

In an embodiment, a computer system 216 may provide a video conference application 214 that is communicably connected to video communication platform 140 and processing engine 102. The video conference application 214 may enable a video conference participant 212 to communicate with other participants on a video conference, including participants joining from video conference application 214 or VR headset 204 or an AR headset.

Figure 3:
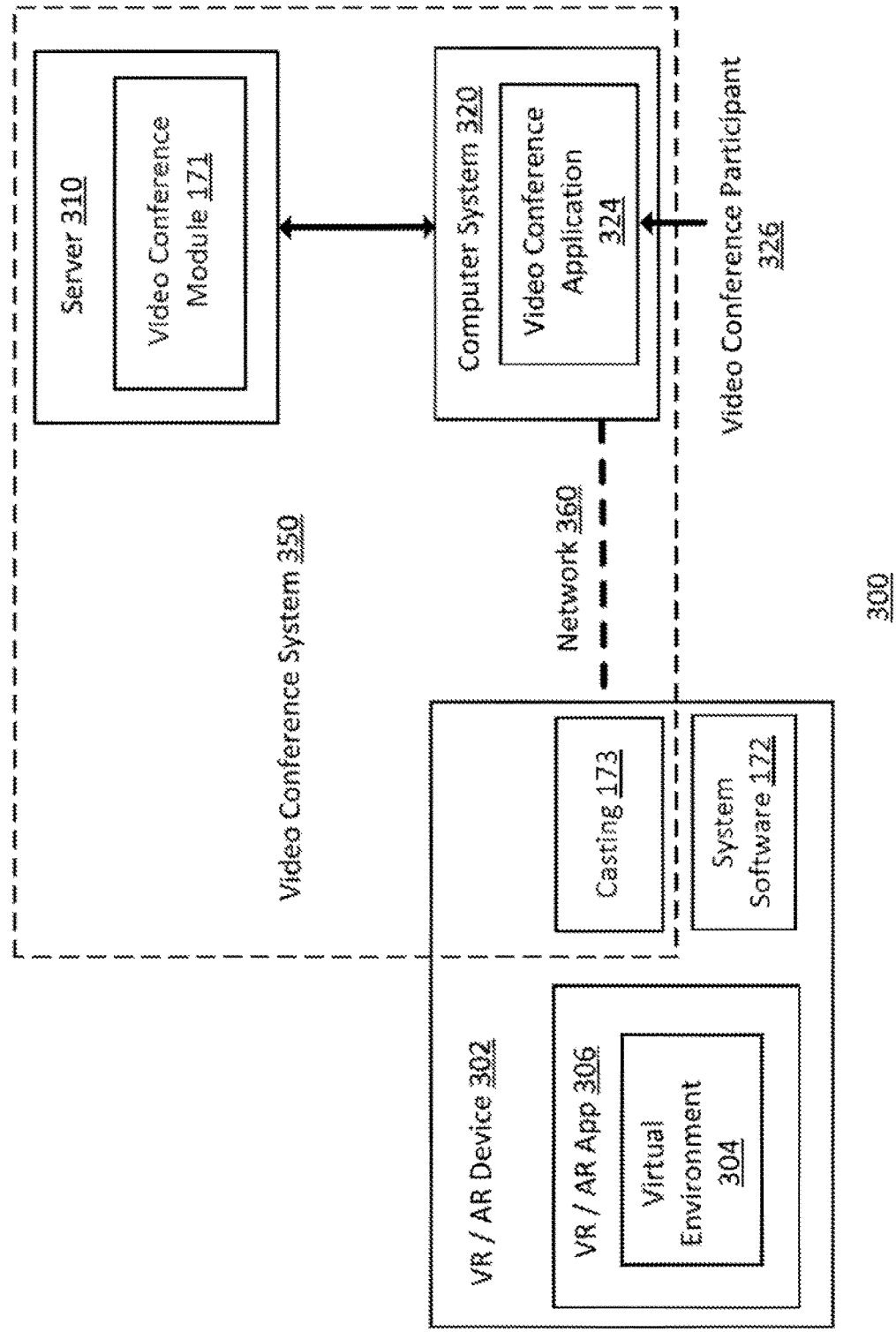
FIG. 3 is a diagram illustrating an exemplary environment in which some embodiments may operate.

FIG. 3 is a diagram illustrating an exemplary environment 300 in which some embodiments may operate. In an embodiment, computer system 320 provides a video conference application 324 that enables video conference participant 326 to join a video conference session. The video conference application 324 connects to server 310 hosting video conference module 171. The video conference module 171 may provide system functionality for hosting one or more video conference sessions and connecting one or more participants via video communications. In an embodiment, computer system 320 may be connected to a VR/AR device 302 over a local network 360. The local network 360 may comprise a wired or wireless network, such as Wi-Fi, Bluetooth, Universal Serial Bus (USB), local area network (LAN), a cellular network, or other networks.

In an embodiment, VR/AR device 302, which may comprise a VR or AR device such as a headset, may comprise a VR/AR application 306. VR/AR application 306 may comprise virtual environment 304, which may comprise a VR environment or AR environment. The VR/AR application 306 may render the virtual environment 306 using two-dimensional (2D) or three-dimensional (3D) graphics. In an embodiment, the VR/AR application 306 may comprise a local-only application without networking capabilities or may comprise a network application that connects to one or more remote computers, such as a server, to provide data or functionality to the VR/AR application 306. Video conference participant 326 may use the VR/AR device 302 to access VR/AR application 306 and interact with virtual environment 304.

In an embodiment, VR/AR device 302 may comprise system software 172 and casting module 173. In an embodiment, system software 172 may include an option to cast an active VR/AR application 306 that is in use to one or more devices, such as computer system 320. In an embodiment, system software 172 may capture a view of the VR/AR application 306, which may comprise a virtual environment view. In an embodiment, the virtual environment view is configured for display in a VR/AR device 302 and not for display on computer system 320. In an embodiment, system software 172 may transform the virtual environment view into 2D video. In an embodiment, transforming the virtual environment view may include applying a 3D transformation to convert the virtual environment view to 2D for viewing on a 2D screen. In an embodiment, system software 172 may transmit the 2D video to casting module 173. In an embodiment, casting module 173 may transmit the 2D video over the network 360 to computer system 320. Computer system 320 may transmit the 2D video to video conference application 324. In an embodiment, video conference application 324 may include a user-selectable option for sharing the view of VR/AR device 302. In an embodiment, the video conference application 324 may stream the 2D video to a video conference session provided by video conference module 171.

In an embodiment, the computer system 320, video conference application 324, server 310, video conference module 171, casting module 173, and network 360 may comprise aspects of a video conference system 350. In an embodiment, the VR/AR device 302, VR/AR application 306, virtual environment 304, and system software 172 may comprise aspects of a $3^{rd}$ party VR or AR application and/or device. Alternatively, the VR/AR device 302, VR/AR application 306, virtual environment 304, and system software 172 may comprise aspects of a first party VR/AR application and/or device that comprise further aspects of video conference system 350.

II. Exemplary Systems

Figure 4:
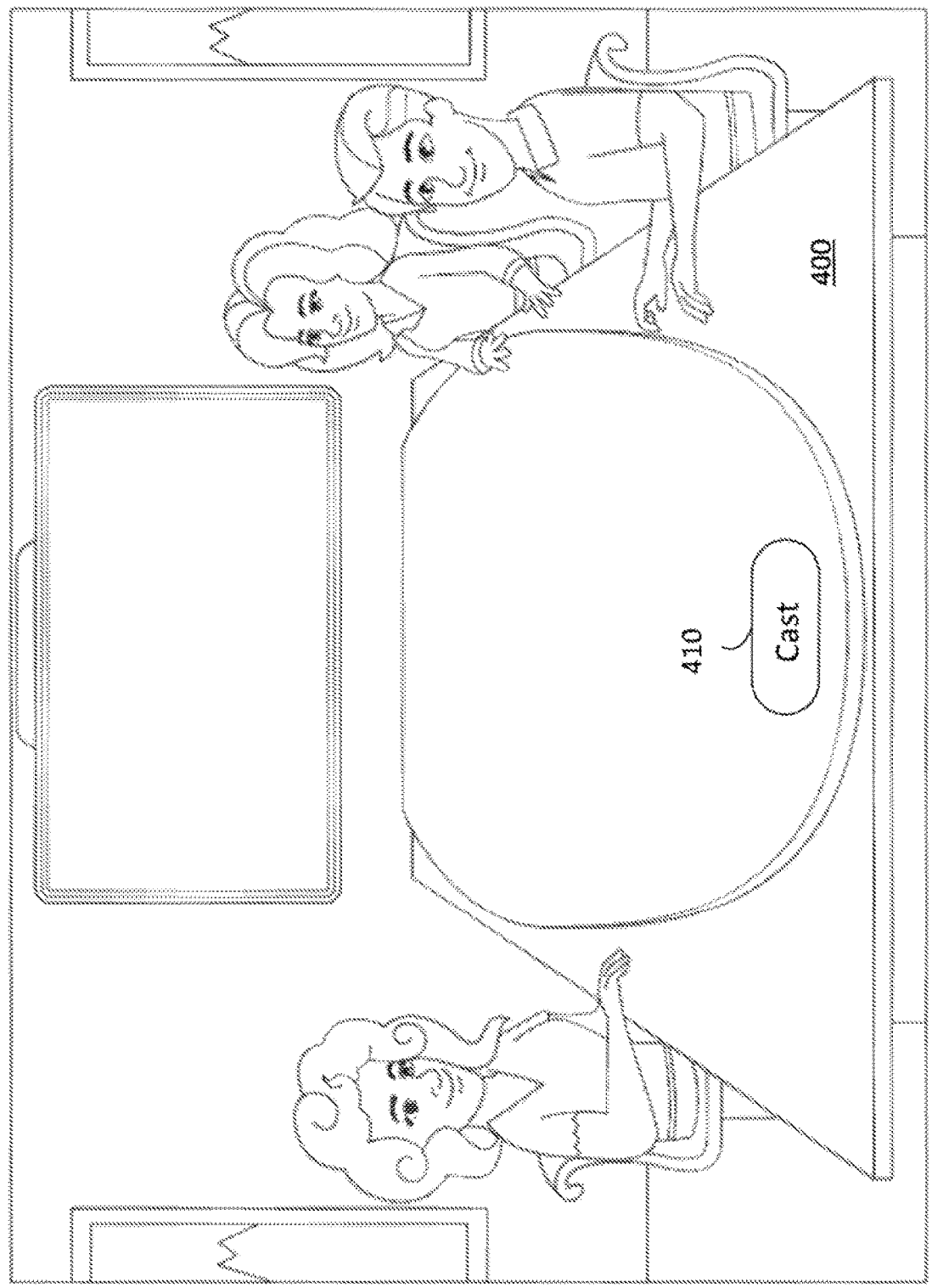
FIG. 4 illustrates an exemplary user interface according to one embodiment of the present disclosure.

FIG. 4 illustrates an exemplary user interface according to one embodiment of the present disclosure. In an embodiment, VR/AR application 306 may display a view of virtual environment 400 to a user. The virtual environment 400 is illustrated as a conference room, but other virtual environments may be presented such as outdoor areas, video game worlds, and so on. In an embodiment, system software 172 may provide a user interface for casting the view of the virtual environment 400 to one or more different devices. In an embodiment, system software 172 may provide a cast button 410 for casting the view. In an embodiment, system software 172 may display user interface elements such as buttons, menus, user interface controls, and other user interface elements to allow casting the view. In an embodiment, the same user interface elements for casting the view may be displayed by system software 172 in a plurality of VR/AR applications. In an embodiment, system software 172 may detect a gesture, movement, user input from a controller, or other user input comprising a user selection to cast the view. In an embodiment, the same user inputs for casting the view may be enabled by system software 172 in a plurality of VR/AR applications.

In an embodiment, system software 172 may receive user selection of the cast button 410. In an embodiment, system software 172 may broadcast a message to devices on the local network 360 to check for availability to receive the cast. In an embodiment, devices on the network 560 that receive the message and have the ability to receive the cast may transmit a response, including an identifier of the device, to the VR/AR device 302 to indicate the availability for casting. In an embodiment, devices capable of receiving the cast may include TV, smartphone, tablet, video conference application, or other devices or applications. In an embodiment, computer system 320 may receive the message from system software 171 and transmit the message to video conference application 324. Video conference application 324 may check that it is available to receive a cast video. In one embodiment, video conference application 324 may check that a video conference session is open on the video conference application 324, and the video conference session is configured to receive a cast video. In one embodiment, a video conference session may include configuration settings for enabling or disabling the ability of video conference participants to cast video into the video conference session. In an embodiment, after determining that it is available to receive a cast, the video conference application 324 may transmit a response to the VR/AR device 302 that it is available for casting. In an embodiment, the system software 172 may receive the responses from the devices on the local network 560 and parse the received identifiers. The system software 172 may display a user interface element on VR/AR device 302 to prompt the user to select a device for casting. In an embodiment, the system software 172 may display a plurality of identifiers of available devices for casting, such as a TV, smartphone, tablet, video conference application, or other devices or applications. In an embodiment, each different type of device on the network 560 may have a corresponding system integration with a casting module 173 for transmitting streaming video to the selected device. The casting module 173 may be configured with transmission protocols for interfacing with the selected device to set up a video stream and transmit video to the selected device.

In one embodiment, system software 172 may check for devices on the network 560 for casting during a configuration session of the VR/AR device 302. When the system software 172 receives messages from the devices to confirm the devices' availability for casting, the system software 172 may store identifiers of the devices in configuration settings. When a request is received from a user to cast, the system software 172 may load the stored identifiers of the devices from the configuration settings and display these identifiers as selectable devices to the user.

In response to receiving user selection of a device, the system software 172 may optionally display a confirmation request for the user to confirm initiating casting. The system software 172 may optionally wait for user confirmation to continue. When a user selection and optional confirmation are received, the system software 172 may transmit a request to the selected device to establish a streaming video connection.

In an embodiment, system software 172 may capture 2D video of a view of the virtual environment for transmission to the selected device. In an embodiment, the view that is captured may comprise the user view comprising the view of the virtual environment displayed by VR/AR device 302 to the user. In an embodiment, VR/AR device 302 may display content in a format that is incompatible with display in the video conference application 324. In one embodiment, VR/AR device 302 may apply a 3D transformation to 2D content prior to display of the content on the VR/AR device 302. Displaying the content from VR/AR device 302 in video conference application 324 may cause the content to appear distorted due to the 3D transformation. In an embodiment, system software 172 may apply an inverse transformation, which may comprise a 3D transformation that is the inverse of the 3D transformation applied during the display of content on VR/AR device 302, to the view of the virtual environment to remove the 3D transformation to generate 2D content. In an embodiment, the inverse 3D transformation may comprise a warping or distortion effect. In an embodiment, system software 172 may capture one or more frames of the 2D content to generate 2D video that is configured for display in the video conference application 324.

In one optional exemplary embodiment, VR/AR device 302 may include a pair of lenses in front of a display, where the lenses are positioned to receive each eye of the user. In an embodiment, the lenses may widen the field of view of the user. In an embodiment, the lenses may also spherically distort the image on the display, such as causing a pincushion distortion. In an embodiment, VR/AR device 302 may apply a 3D spherical transformation, such as a barrel distortion, that is the inverse to the pincushion distortion of the lenses to images in the framebuffer of the VR/AR device 302 to cause the images to appear normally to the human eye when viewed through the lenses. In an embodiment, images in the framebuffer of VR/AR device 302 may include the barrel distortion effect. In an embodiment, system software 172 may apply an inverse 3D spherical transformation to the images in the framebuffer to remove the barrel distortion. In an embodiment, the system software 172 may apply a 3D spherical transformation that simulates the distortion of the lenses to the images in the framebuffer. In an embodiment, the 3D spherical transformation may comprise a pincushion transformation. In an embodiment, system software 172 samples images from the framebuffer of the VR/AR device 302 over time to generate a plurality of sequential VR/AR video frames. In an embodiment, system software 172 may apply a 3D transformation to each of the sampled VR/AR video frames to generate a series of undistorted images comprising 2D video frames, which in the aggregate may comprise 2D video.

In an exemplary embodiment, VR/AR device 302 may optionally display a separate image to each eye of the user for stereoscopic imaging. In an embodiment, system software 172 may select the images displayed to one of the eyes to use for generating the 2D video for casting. In an embodiment, system software 172 may arbitrarily choose to cast the video from the display to the left eye or the display to the right eye. In one embodiment, a user-selectable configuration setting may be provided for selecting to cast the video from the display to the left eye or the display to the right eye. Alternatively, system software 172 may combine the images displayed to each eye to generate the 2D video for casting.

In an embodiment, system software 172 selects a corresponding system integration, comprising casting module 173, for casting the 2D video to the selected device. In an embodiment, system software 172 provides the 2D video to the casting module 173. In an embodiment, casting module 173 may encode the 2D video in a format configured to be read by the selected device, such as the video conference application 324. In an embodiment, the video content may comprise 2D video formats such as MP4, MP3, AVI, FLV, WMV, and other formats. In an embodiment, the casting module 173 transmits the 2D video to the computer system 320, and computer system 320 provides the 2D video to the video conference application 324. In an embodiment, the video conference application 324 may display the 2D video to the video conference participant 326. In an embodiment, the video conference application 324 may check that a video conference session is open on the video conference application 324, and the video conference session is configured to receive a cast video. In an embodiment, the video conference application 324 may stream the 2D video to the video conference session. In an embodiment, the 2D video may be displayed to a plurality of video conference participants in the video conference session.

Figure 5:
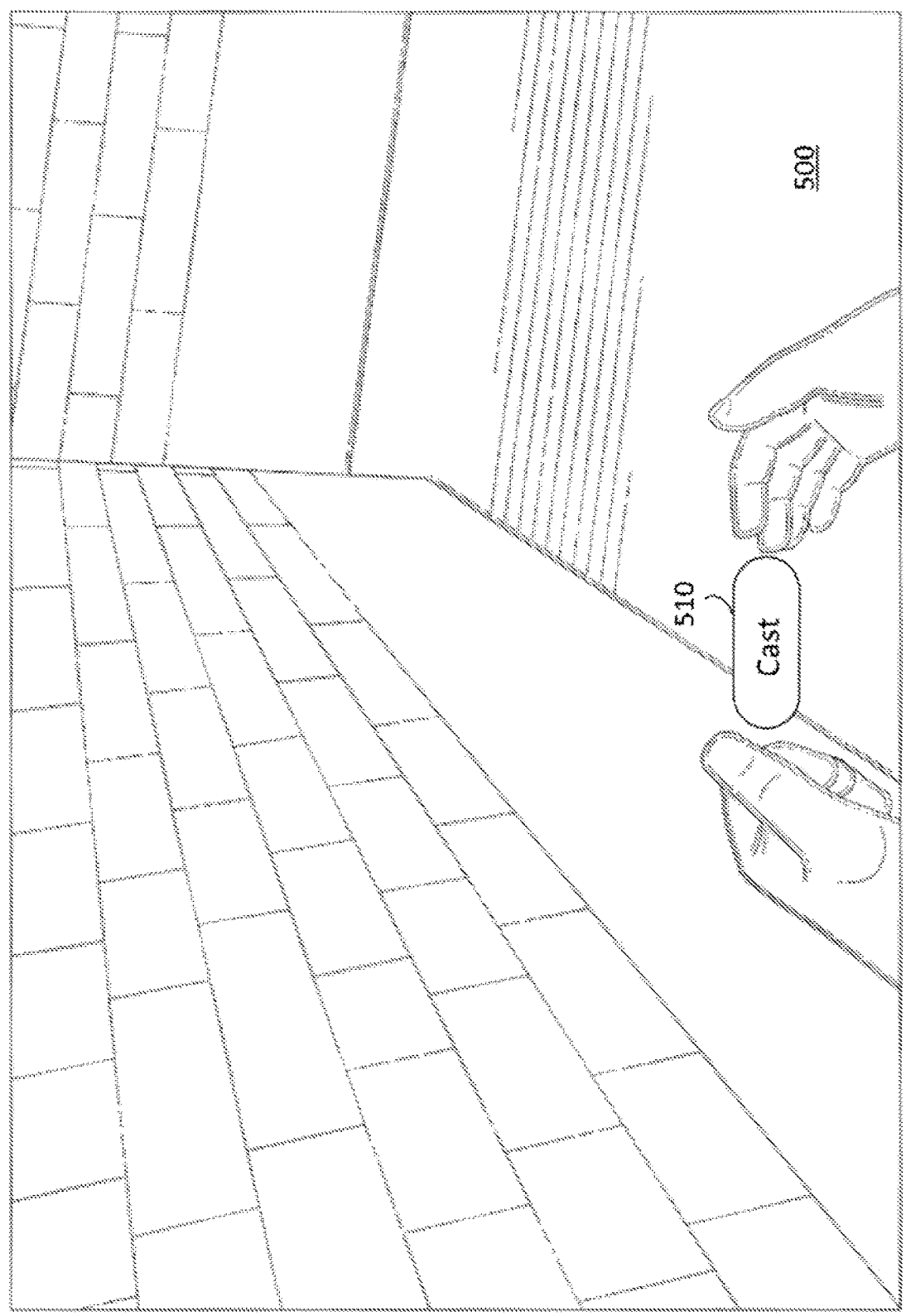
FIG. 5 illustrates an exemplary user interface according to one embodiment of the present disclosure.

FIG. 5 illustrates an exemplary user interface according to one embodiment of the present disclosure. In an embodiment, VR/AR application 306 may display a view of virtual environment 500 to a user. In an embodiment, the VR/AR application 306 may comprise, for example, a productivity application, a meeting application, a communications application, a social media application, a video game, or other types of applications. Virtual environments may comprise a variety of possible environments such as a 3D world, real-world settings, fantasy settings, outdoor settings, indoor settings, and other environments. In an embodiment, virtual environment 500 may include an avatar of the user. In an embodiment, a virtual environment 500 may enable user interactions in the environment. In an embodiment, virtual environment 500 may enable touching or interacting with objects in the environment. In an embodiment, virtual environment 500 may enable picking up or dropping objects. In an embodiment, VR/AR device 302 may receive user inputs from sensors in a headset and/or user interface controls on a controller, which may be translated into actions of the avatar of the user in the virtual environment 500. In an embodiment, the avatar may travel to different rooms in the virtual environment or move to different locations. Virtual environment 500 may include cast button 510, which may include the same functionality as cast button 410.

Figure 6:
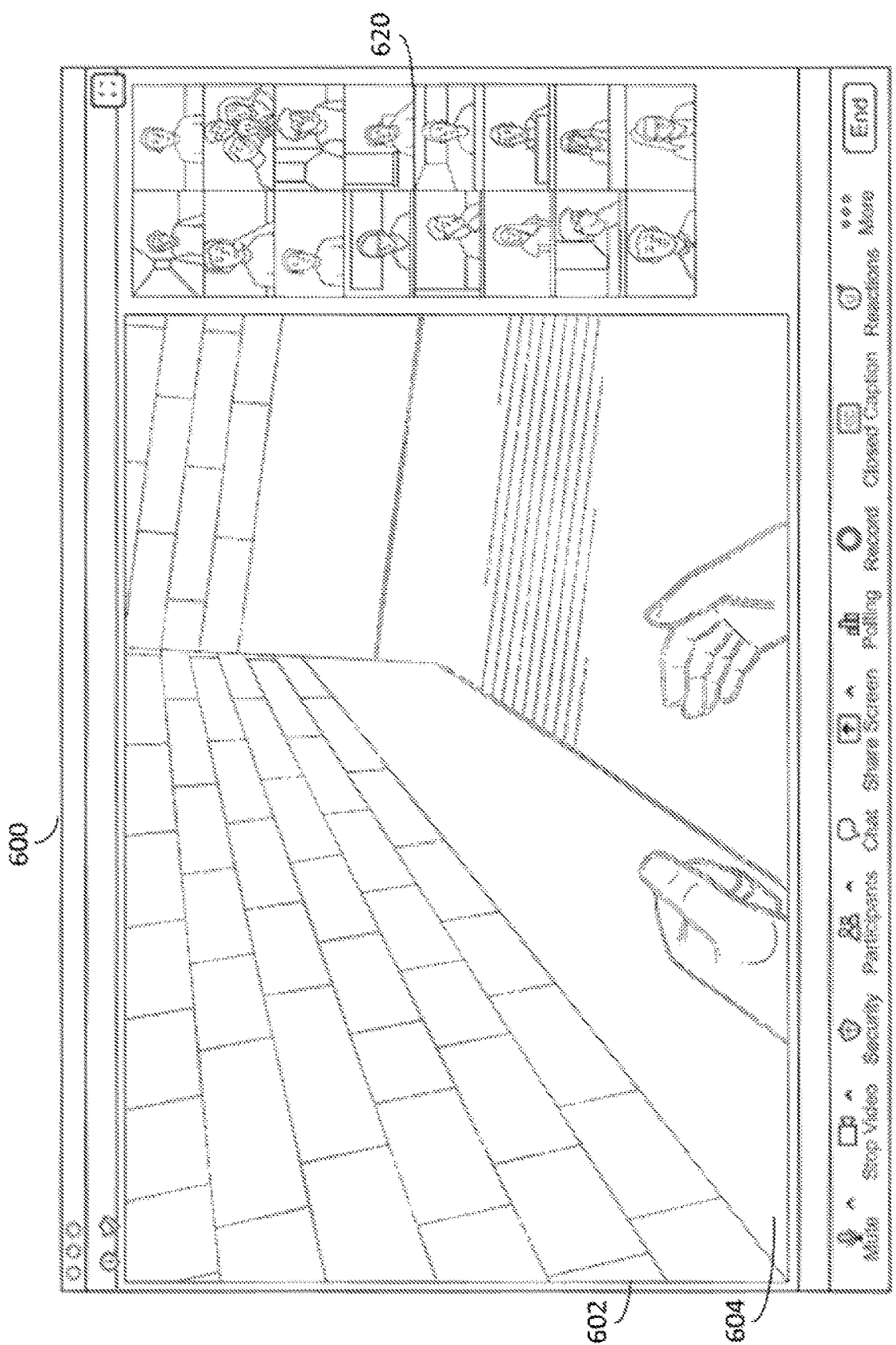
FIG. 6 illustrates an exemplary user interface according to one embodiment of the present disclosure.

FIG. 6 illustrates an exemplary user interface 600 according to one embodiment of the present disclosure. User interface 600 may comprise the interface of a video conference application. Content view 602 may comprise video content 604, such as streaming video, such as video content cast from VR/AR device 302. In an embodiment, the cast video content 604 may be uploaded to video conference module 171 by video conference application 324 and streamed by the video conference module to the video conference participants in the video conference session. In an embodiment, the video content may be encoded in streaming video format by an encoder on computer system 320 or VR/AR device 302. In an embodiment, the video content may comprise 2D video formats such as MP4, MP3, AVI, FLV, WMV, and other formats. In an embodiment, user interface 600 may include user interface controls for starting or stopping sharing of the cast video 604. When user interface input is received to stop sharing the cast video, then streaming of video 604 is stopped. When user interface input is received to start sharing the cast video, then streaming of video 604 is initiated.

In an embodiment, user interface 600 may display a streaming selection view for displaying one or more selectable views that may be streamed. For example, a streaming selection view may display one or more screens or windows of the computer system 320 that may be shared and a currently casting video from VR/AR device 302. In response to user selection of a view, the video conference application may initiate streaming of the selected view.

In an embodiment, a plurality of modes may be selected for content view 602, such as a speaker view for displaying a currently speaking participant, gallery view for displaying a grid of streaming video of participants, presentation view for displaying the screen of another participant, and other views. In an embodiment, the user interface 600 may include thumbnail videos 620 displaying streaming video of video conference participants in a video conference session. The streaming video of the video conference participants may be updated in real time. In an embodiment, user interface 600 may include one or more user interface controls for controlling the video conference, sharing the screen, recording, and so on.

Figure 7:
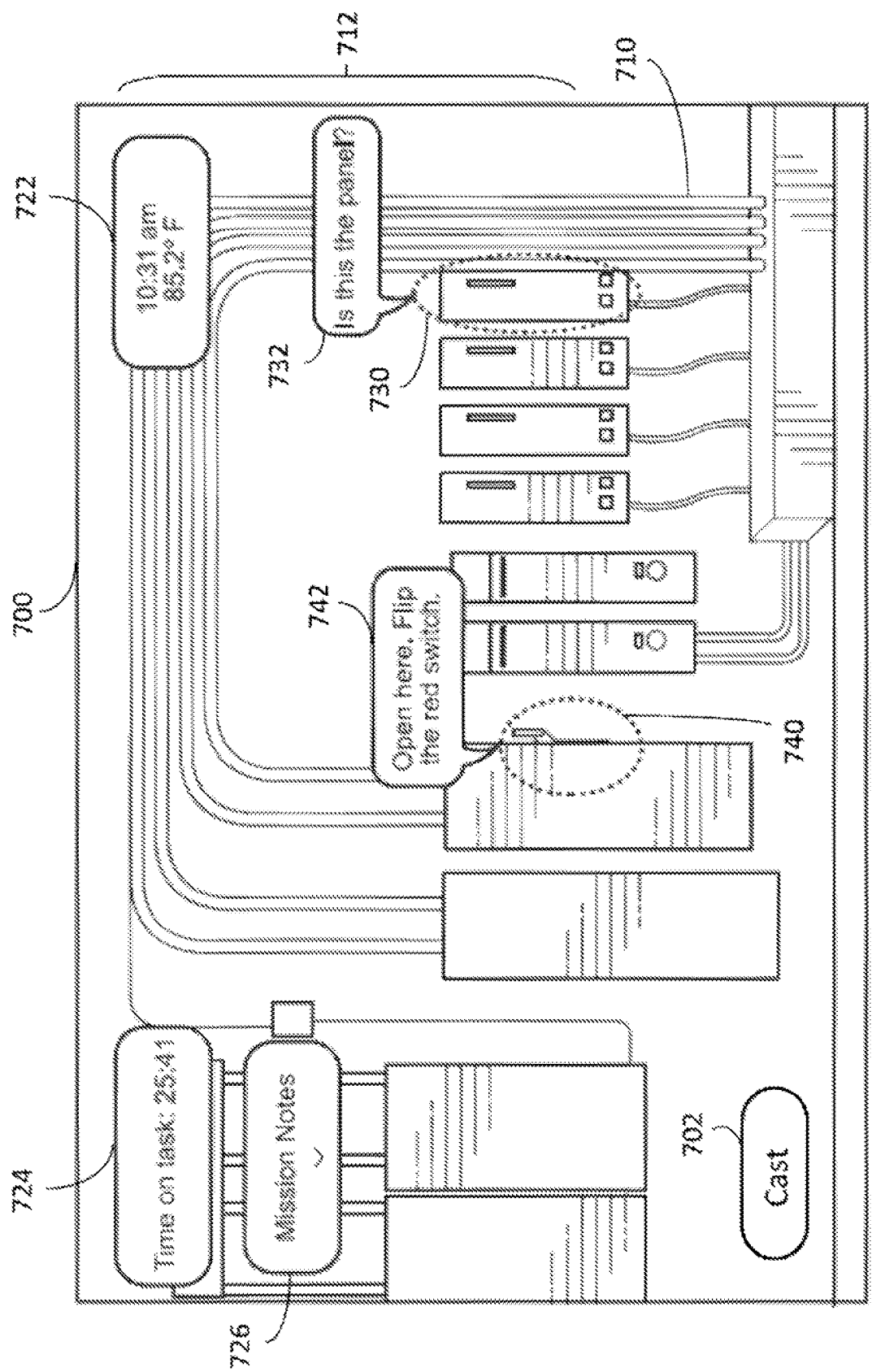
FIG. 7 illustrates an exemplary AR view according to one embodiment of the present disclosure.

FIG. 7 illustrates an exemplary AR view 700 according to one embodiment of the present disclosure. In an embodiment, AR view 700 may be displayed by an AR device, such as an AR headset. In an embodiment, VR/AR application 306 may display one or more objects in a virtual environment 712, comprising an AR environment, overlayed on a real-world environment 710. The AR view 700 may comprise a mixed reality view including both AR objects and real-world objects. In an embodiment, AR device may display objects to the user on a screen, through retinal projection, or other AR technologies.

In an embodiment, AR view 700 may include a time display 722, task display 724, notes display 726, user drawings 730, 740, user annotations 732, 742, and/or other AR objects. These AR objects may exist in the virtual environment 1112. In an embodiment, additional AR objects may be displayed such as objects representing real-world objects, effects, shapes, text, and other objects. In an embodiment, 3D avatars of one or more users may be displayed in the virtual environment 1112. In an embodiment, 3D objects such as tools, arrows, indicators, and other objects may be displayed in the virtual environment 1112.

In an embodiment, system software 172 may display cast button 702 for casting the AR view 700 to video conference application 324. In an embodiment, cast button 702 may enable capturing video content of the AR view 700 for transmitting to the video conference application 324 as described with respect to FIG. 4 and elsewhere herein. In an embodiment, a camera on AR device captures video of the real-world environment 1110 from the perspective of the AR user in the real-world environment. A processor may add AR objects from the AR environment 712 in AR view 1100 on top of the captured real-world video. Optionally, AR environment 712 may be distorted by a 3D transformation when displayed to the user on the AR device, as described with respect to FIG. 4 and elsewhere herein. In an embodiment, system software 712 may apply an inverse 3D transformation to images of the AR environment 712 to remove the distortion as described elsewhere herein. In an embodiment, an image of the AR objects in the AR environment 712 is overlayed on top of the real-world video from the AR device camera. The system software 712 may provide the combined video to casting module 713, and casting module 713 may transmit the combined video to the video conference application 324.

Figure 8:
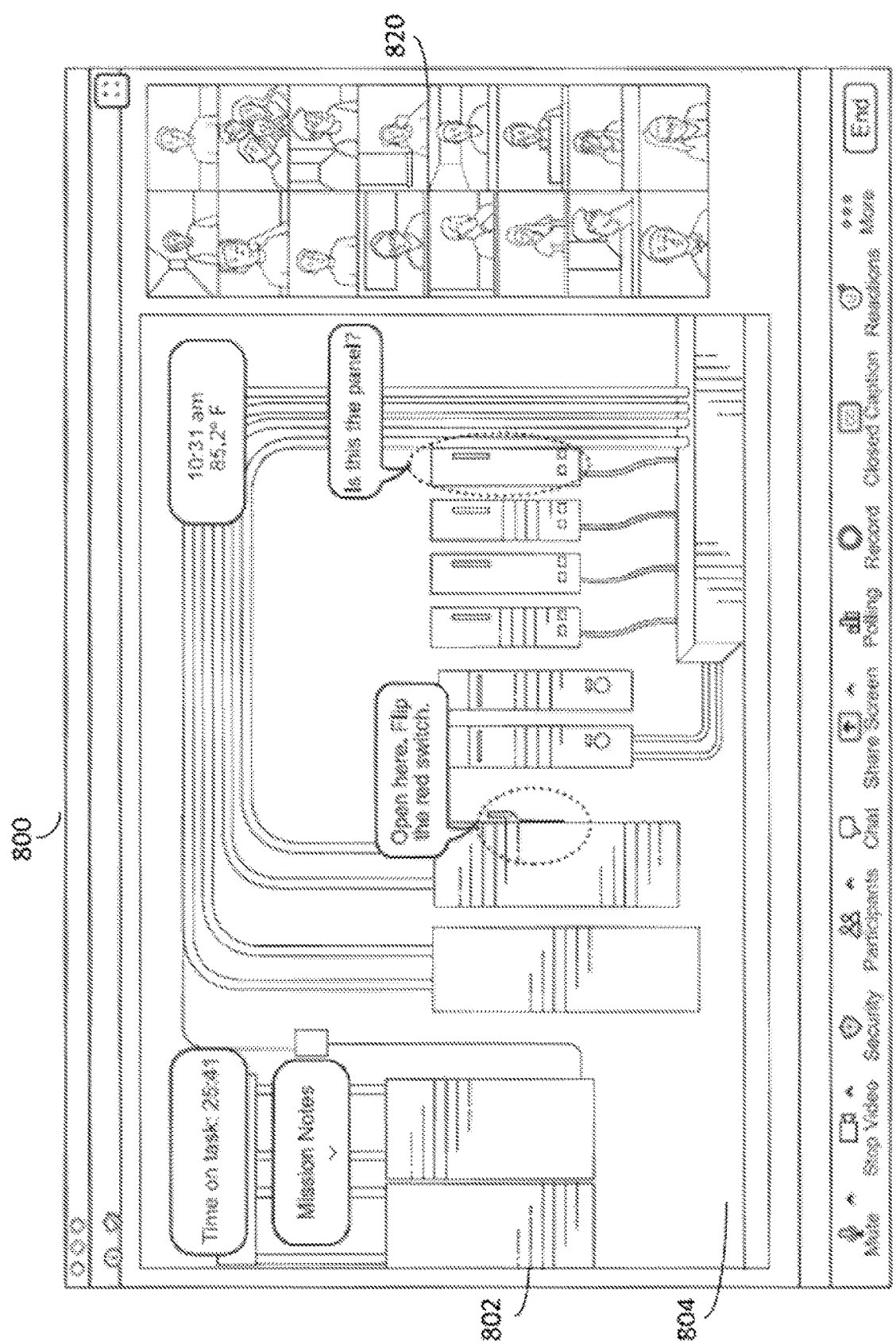
FIG. 8 illustrates an exemplary user interface according to one embodiment of the present disclosure.

FIG. 8 illustrates an exemplary user interface 800 according to one embodiment of the present disclosure. As described elsewhere herein, user interface 800 of a video conference application may comprise a content view 802 for displaying video content 804. In an embodiment, video content 804 may comprise streaming video from an AR device, including AR objects overlayed on real-world video. In an embodiment, video conference application may display the AR video content 804 to the user. In an embodiment, video conference application may stream the AR video content 804 to a video conference session. In an embodiment, video conference application uploads the AR video content 804 to video conference module 171, and video conference module 171 streams the AR video content 804 to video conference participants in the video conference session. In an embodiment, the user interface 800 may include streaming video thumbnails 820 of video conference participants in the video conference session.

III. Exemplary Methods

Figure 9:
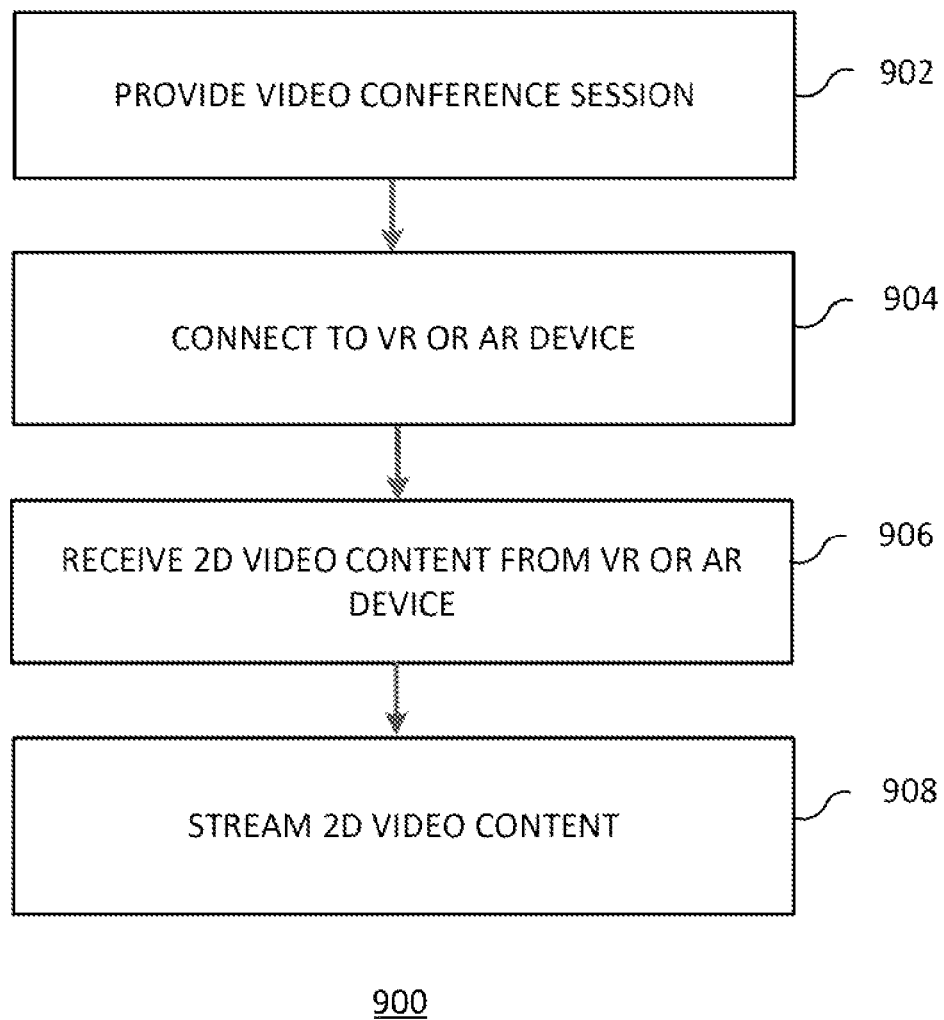
FIG. 9 illustrates an exemplary method that may be performed in some embodiments.

FIG. 9 illustrates an exemplary method 900 that may be performed in some embodiments.

At step 902, a video conference session is provided in a video conference application on a computer system. In an embodiment, the video conference session is hosted on a video conference server and may connect a plurality of video conference participants.

At step 904, a connection is established between the video conference application and a VR or AR device. In an embodiment, the video conference application and VR or AR device may be connected over a local network, such as Wi-Fi, Bluetooth, Universal Serial Bus (USB), local area network (LAN), a cellular network, or other networks. In an embodiment, the VR or AR device may capture 2D video content and transmit the 2D video content to the video conference application under control of a system-level module of the VR or AR device that is external to a VR or AR application. In an embodiment, the system-level module may comprise system software or a system integration, such as a casting module.

At step 906, 2D video content is received by the video conference application from the VR or AR device. The 2D video content may comprise streaming video of a user view of a virtual environment in a VR or AR application on the VR or AR device. In an embodiment, the user view may comprise a view of the virtual environment displayed by the VR or AR device to a user. In an embodiment, the user view may comprise imagery in a frame buffer of the VR or AR device. In an embodiment, system software may apply a 3D spherical transformation to the user view of the virtual environment to generate the 2D video content. In an embodiment, system software may apply a transformation simulating the effect of one or more lenses of the VR/AR device to the user view of the virtual environment to generate the 2D video content.

At step 908, the 2D video content may be streamed in the video conference session to one or more video conference participants. In an embodiment, the 2D video content may be displayed to the one or more video conference participants.

Exemplary Computer System

Figure 10:
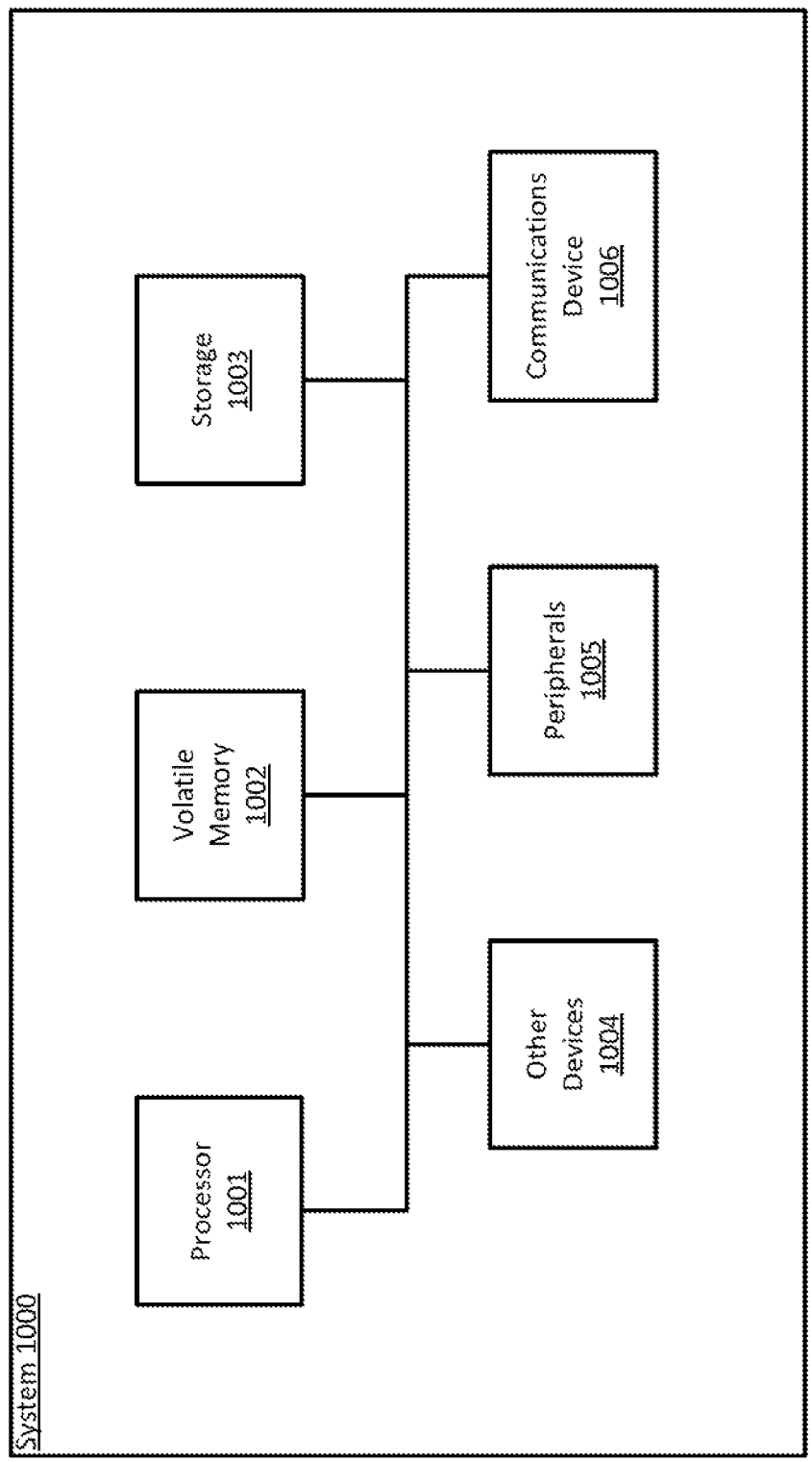
FIG. 10 is a diagram illustrating an exemplary computer that may perform processing in some embodiments.

FIG. 10 is a diagram illustrating an exemplary computer that may perform processing in some embodiments. Exemplary computer 1000 may perform operations consistent with some embodiments. The architecture of computer 1000 is exemplary. Computers can be implemented in a variety of other ways. A wide variety of computers can be used in accordance with the embodiments herein.

Processor 1001 may perform computing functions such as running computer programs. The volatile memory 1002 may provide temporary storage of data for the processor 1001. RAM is one kind of volatile memory. Volatile memory typically requires power to maintain its stored information. Storage 1003 provides computer storage for data, instructions, and/or arbitrary information. Non-volatile memory, which can preserve data even when not powered and including disks and flash memory, is an example of storage. Storage 1003 may be organized as a file system, database, or in other ways. Data, instructions, and information may be loaded from storage 1003 into volatile memory 1002 for processing by the processor 1001.

The computer 1000 may include peripherals 1005. Peripherals 1005 may include input peripherals such as a keyboard, mouse, trackball, video camera, microphone, and other input devices. Peripherals 1005 may also include output devices such as a display. Peripherals 1005 may include removable media devices such as CD-R and DVD-R recorders/players. Communications device 1006 may connect the computer 1000 to an external medium. For example, communications device 1006 may take the form of a network adapter that provides communications to a network. A computer 1000 may also include a variety of other devices 1004. The various components of the computer 1000 may be connected by a connection medium such as a bus, crossbar, or network.

It will be appreciated that the present disclosure may include any one and up to all of the following examples.

Example 1: A method comprising: providing a video conference session m a video conference application on a computer system; establishing a connection between the video conference application and a VR or AR device; receiving, by the video conference application, 2D video content from the VR or AR device, the 2D video content comprising streaming video of a user view of a virtual environment in a VR or AR application on the VR or AR device; streaming the 2D video content in the video conference session to one or more video conference participants.

Example 2: The method of Example 1, wherein the virtual environment comprises a VR environment including 3D avatars of one or more users.

Example 3: The method of any of Examples 1-2, wherein the virtual environment comprises an AR environment comprising one or more AR holograms.

Example 4: The method of any of Examples 1-3, further comprising: applying a 3D spherical transformation to the user view of the virtual environment to generate the 2D video content.

Example 5: The method of any of Examples 1-4, further comprising: applying a transformation simulating the effect of one or more lenses of the VR/AR device to the user view of the virtual environment to generate the 2D video content.

Example 6: The method of any of Examples 1-5, further comprising: capturing the 2D video content and transmitting the 2D video content to the video conference application under control of a system-level module of the VR/AR device that is external to the VR or AR application.

Example 7: The method of any of Examples 1-6, wherein the 2D video content comprises real-world video combined with an overlay of one or more AR objects.

Example 8: The method of any of Examples 1-7, further comprising: applying a 3D transformation to the user view of the virtual environment to generate the 2D video content by a system-level module of the VR/AR device that is external to the VR or AR application.

Example 9: The method of any of Examples 1-8, further comprising: capturing the 2D video content and transmitting the 2D video content to the video conference application under control of a casting module that comprises a component of a video conference system.

Example 10: The method of any of Examples 1-9, wherein the VR or AR device includes options to cast to a plurality of device types.

Example 11: The method of any of Examples 1-10, wherein the video conference application connects to the VR or AR device over a local network.

Example 12: The method of any of Examples 1-11, further comprising: scanning a local network to identify one or more devices for receiving a cast video.

Example 13: The method of any of Examples 1-12, further comprising: capturing the 2D video content and encoding the 2D video content in a streaming video format.

Example 14: The method of any of Examples 1-13, wherein the VR or AR device comprises a system integration for casting to the video conference application.

Example 15: The method of any of Examples 1-14, wherein the VR or AR device comprises a plurality of system integrations for casting to a plurality of different device types.

Example 16: The method of any of Examples 1-15, further comprising: selecting one display from a plurality of displays to the eyes of the user to generate the 2D video content.

Example 17: A non-transitory computer readable medium that stores executable program instructions that when executed by one or more computing devices configure the one or more computing devices to perform operations comprising: providing a video conference session in a video conference application on a computer system; establishing a connection between the video conference application and a VR or AR device; receiving, by the video conference application, 2D video content from the VR or AR device, the 2D video content comprising streaming video of a user view of a virtual environment in a VR or AR application on the VR or AR device; streaming the 2D video content in the video conference session to one or more video conference participants.

Example 18: The non-transitory computer readable medium of Example 17, wherein the virtual environment comprises a VR environment including 3D avatars of one or more users.

Example 19: The non-transitory computer readable medium of any of Examples 17-18, wherein the virtual environment comprises an AR environment comprising one or more AR holograms.

Example 20: The non-transitory computer readable medium of any of Examples 17-19, wherein the executable program instructions further configure the one or more computing devices to perform operations comprising: applying a 3D spherical transformation to the user view of the virtual environment to generate the 2D video content.

Example 21: The non-transitory computer readable medium of any of Examples 17-20, wherein the executable program instructions further configure the one or more computing devices to perform operations comprising: applying a transformation simulating the effect of one or more lenses of the VR/AR device to the user view of the virtual environment to generate the 2D video content.

Example 22: The non-transitory computer readable medium of any of Examples 17-21, wherein the executable program instructions further configure the one or more computing devices to perform operations comprising: capturing the 2D video content and transmitting the 2D video content to the video conference application under control of a system-level module of the VR/AR device that is external to the VR or AR application.

Example 23: The non-transitory computer readable medium of any of Examples 17-22, wherein the 2D video content comprises real-world video combined with an overlay of one or more AR objects.

Example 24: The non-transitory computer readable medium of any of Examples 17-23, wherein the executable program instructions further configure the one or more computing devices to perform operations comprising: applying a 3D transformation to the user view of the virtual environment to generate the 2D video content by a system-level module of the VR/AR device that is external to the VR or AR application.

Example 25: The non-transitory computer readable medium of any of Examples 17-24, wherein the executable program instructions further configure the one or more computing devices to perform operations comprising: capturing the 2D video content and transmitting the 2D video content to the video conference application under control of a casting module that comprises a component of a video conference system.

Example 26: The non-transitory computer readable medium of any of Examples 17-25, wherein the VR or AR device includes options to cast to a plurality of device types.

Example 27: The non-transitory computer readable medium of any of Examples 17-26, wherein the video conference application connects to the VR or AR device over a local network.

Example 28: The non-transitory computer readable medium of any of Examples 17-27, wherein the executable program instructions further configure the one or more computing devices to perform operations comprising: scanning a local network to identify one or more devices for receiving a cast video.

Example 29: The non-transitory computer readable medium of any of Examples 17-28, wherein the executable program instructions further configure the one or more computing devices to perform operations comprising: capturing the 2D video content and encoding the 2D video content in a streaming video format.

Example 30: The non-transitory computer readable medium of any of Examples 17-29, wherein the VR or AR device comprises a system integration for casting to the video conference application.

Example 31: The non-transitory computer readable medium of any of Examples 17-30, wherein the VR or AR device comprises a plurality of system integrations for casting to a plurality of different device types.

Example 32: The non-transitory computer readable medium of any of Examples 17-31, wherein the executable program instructions further configure the one or more computing devices to perform operations comprising:

selecting one display from a plurality of displays to the eyes of the user to generate the 2D video content.

Example 33: A system comprising one or more processors configured to perform the operations of: providing a video conference session in a video conference application on a computer system; establishing a connection between the video conference application and a VR or AR device; receiving, by the video conference application, 2D video content from the VR or AR device, the 2D video content comprising streaming video of a user view of a virtual environment in a VR or AR application on the VR or AR device; streaming the 2D video content in the video conference session to one or more video conference participants.

Example 34: The system of Example 33, wherein the virtual environment comprises a VR environment including 3D avatars of one or more users.

Example 35: The system of any of Examples 33-34, wherein the virtual environment comprises an AR environment comprising one or more AR holograms.

Example 36: The system of any of Examples 33-35, wherein the processors are further configured to perform the operations of: applying a 3D spherical transformation to the user view of the virtual environment to generate the 2D video content.

Example 37: The system of any of Examples 33-36, wherein the processors are further configured to perform the operations of: applying a transformation simulating the effect of one or more lenses of the VR/AR device to the user view of the virtual environment to generate the 2D video content.

Example 38: The system of any of Examples 33-37, wherein the processors are further configured to perform the operations of: capturing the 2D video content and transmitting the 2D video content to the video conference application under control of a system-level module of the VR/AR device that is external to the VR or AR application.

Example 39: The system of any of Examples 33-38, wherein the 2D video content comprises real-world video combined with an overlay of one or more AR objects.

Example 40: The system of any of Examples 33-39, wherein the processors are further configured to perform the operations of: applying a 3D transformation to the user view of the virtual environment to generate the 2D video content by a system-level module of the VR/AR device that is external to the VR or AR application.

Example 41: The system of any of Examples 33-40, wherein the processors are further configured to perform the operations of: capturing the 2D video content and transmitting the 2D video content to the video conference application under control of a casting module that comprises a component of a video conference system.

Example 42: The system of any of Examples 33-41, wherein the VR or AR device includes options to cast to a plurality of device types.

Example 43: The system of any of Examples 33-42, wherein the video conference application connects to the VR or AR device over a local network.

Example 44: The system of any of Examples 33-43, wherein the processors are further configured to perform the operations of: scanning a local network to identify one or more devices for receiving a cast video.

Example 45: The system of any of Examples 33-44, wherein the processors are further configured to perform the operations of: capturing the 2D video content and encoding the 2D video content in a streaming video format.

Example 46: The system of any of Examples 33-45, wherein the VR or AR device comprises a system integration for casting to the video conference application.

Example 47: The system of any of Examples 33-46, wherein the VR or AR device comprises a plurality of system integrations for casting to a plurality of different device types.

Example 48: The system of any of Examples 33-47, wherein the processors are further configured to perform the operations of: selecting one display from a plurality of displays to the eyes of the user to generate the 2D video content.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   notifying one or more video conference participants of a video conference session in a video conference application that at least one unauthenticated participant is present in the video conference session;
   establishing a connection between the video conference application and a virtual reality (VR) device that does not have casting functionality;
   providing, for display via the VR device, video of the one or more video conference participants;
   selecting a three-dimensional (3D) user view in a virtual environment;
   encoding frames of the selected 3D user view to frames of two-dimensional (2D) video content; and
   casting the 2D video content to the video conference session.

2. The method of claim 1, wherein the virtual environment comprises a VR environment including 3D objects.

3. The method of claim 1, wherein the virtual environment comprises an augmented reality (AR) environment comprising one or more AR holograms.

4. The method of claim 1, further comprising:
   applying a 3D spherical transformation to the selected 3D user view of the virtual environment to generate the 2D video content.

5. The method of claim 1, further comprising:
   applying a transformation simulating an effect of one or more lenses of the VR device to the selected 3D user view of the virtual environment to generate the 2D video content.

6. The method of claim 1, further comprising:
   capturing the 2D video content and transmitting the 2D video content to the video conference application under control of a system-level module of the VR device that is external to a VR application.

7. The method of claim 1, wherein the 2D video content comprises real-world video combined with an overlay of one or more augmented reality (AR) objects.

8. A non-transitory computer readable medium comprising stored executable program instructions, that when executed by one or more processors, cause the one or more processors to perform operations comprising:
   notifying one or more video conference participants of a video conference session in a video conference application that at least one unauthenticated participant is present in the video conference session;
   establishing a connection between the video conference application and a virtual reality (VR) device that does not have casting functionality;
   providing, for display via the VR device, video of the one or more video conference participants;
   selecting a three-dimensional (3D) user view in a virtual environment;
   encoding frames of the selected 3D user view to frames of two-dimensional (2D) video content; and
   casting the 2D video content to the video conference session.

9. The non-transitory computer readable medium of claim 8, wherein the virtual environment comprises a VR environment of a conference room.

10. The non-transitory computer readable medium of claim 8, wherein the virtual environment comprises an augmented reality (AR) environment comprising one or more AR holograms.

11. The non-transitory computer readable medium of claim 8, wherein the operations further comprise:
    applying a 3D spherical transformation to the selected 3D user view of the virtual environment to generate the 2D video content.

12. The non-transitory computer readable medium of claim 8, wherein the operations further comprise:
    applying a transformation simulating an effect of one or more lenses of the VR device to the selected 3D user view of the virtual environment to generate the 2D video content.

13. The non-transitory computer readable medium of claim 8, wherein the operations further comprise:
    capturing the 2D video content and transmitting the 2D video content to the video conference application under control of a system-level module of the VR device that is external to a VR application.

14. The non-transitory computer readable medium of claim 8, wherein the 2D video content comprises real-world video combined with an overlay of one or more augmented reality (AR) objects.

15. A system comprising:
    one or more processors configured to:
      notify one or more video conference participants of a video conference session in a video conference application that at least one unauthenticated participant is present in the video conference session;
      establish a connection between the video conference application and a virtual reality (VR) device that does not have casting functionality;
      provide, for display via the VR device, video of the one or more video conference participants;
      select a three-dimensional (3D) user view in a virtual environment;
      encode frames of the selected 3D user view to frames of two-dimensional (2D) video content; and
      cast the 2D video content to the video conference session.

16. The system of claim 15, wherein the virtual environment comprises a VR environment of an outdoor area.

17. The system of claim 15, wherein the virtual environment comprises an augmented reality (AR) environment.

18. The system of claim 15, wherein the one or more processors are further configured to:
    apply a 3D spherical transformation to the selected 3D user view of the virtual environment to generate the 2D video content.

19. The system of claim 15, wherein the one or more processors are further configured to:
   apply a transformation simulating an effect of one or more lenses of the VR device to the selected 3D user view of the virtual environment to generate the 2D video content.

20. The system of claim 15, wherein the one or more processors is further configured to:
   transmit the 2D video content to the video conference application under control of a system-level module of the VR device that is external to a VR application.

\* \* \* \* \*